(12) United States Patent
Qiao et al.

(10) Patent No.: US 7,920,833 B2
(45) Date of Patent: Apr. 5, 2011

(54) RADIO FRONT END WITH RESONANT TRANSMIT/RECEIVE SWITCH

(75) Inventors: Dongjaing Qiao, San Diego, CA (US);
Scott Kee, Dana Point, CA (US); Ichiro Aoki, San Clemente, CA (US); Donald McClymont, Dana Point, CA (US)

(73) Assignee: Axiom Microdevices, Inc., Irvine, CA (US)

( * ) Notice: Subject to any disclaimer, the term of this patent is extended or adjusted under 35 U.S.C. 154(b) by 761 days.

(21) Appl. No.: 11/827,188

(22) Filed: Jul. 11, 2007

(65) Prior Publication Data
US 2009/0017775 A1    Jan. 15, 2009

(51) Int. Cl.
*H04B 1/44* (2006.01)
(52) U.S. Cl. .......................................................... 455/78
(58) Field of Classification Search ..................... 455/78
See application file for complete search history.

(56) References Cited

U.S. PATENT DOCUMENTS

| 4,577,171 | A | * | 3/1986 | Heigl et al. ........................ 334/1 |
| 5,697,069 | A | | 12/1997 | Boehm et al. |
| 2005/0107043 | A1 | | 5/2005 | Avasarala et al. |

FOREIGN PATENT DOCUMENTS
WO    2004036788    4/2004

OTHER PUBLICATIONS

J. Jeon and W.B. Kuhn, "A UHF CMOS Transceiver Front-end with Resonant TR Switch," in Proc. IEEE Radio Wireless Symp, Jan. 2007, pp. 71-74.*
Tokumitsu et al., "A Low-Voltage, High-Power T/R Switch MMIC Using LC Resonators," *IEEE Transactions on Microwave Theory and Techniques*, vol. 43, No. 4, May 1995.
Kuhn et al., "A Resonant Switch for LNA Protection in Watt-Level CMOS Transceivers," *IEEE Transactions on Microwave Theory and Techniques*, vol. 53, No. 9, Sep. 2005.
International Search report and Written Opinion for Corresponding PCT Application No. PCT/US2008/069609, mailed Jan. 26, 2001, Applicant: Axiom Microdevices, Inc., Jul. 10, 2008.

* cited by examiner

*Primary Examiner* — Matthew D Anderson
*Assistant Examiner* — Erica Fleming-Hall
(74) *Attorney, Agent, or Firm* — Jackson Walker L.L.P.; Christopher J. Rourk

(57) ABSTRACT

A device having a radio front end is provided. The radio front end includes an inductor having a first end and a second end. A capacitor having a first end and a second end is connected to the second end of the inductor. An antenna is connected to the second end of the inductor and the second end of the capacitor. A first switch is connected to the first end of the inductor and the first end of the capacitor, wherein the inductor and capacitor form a resonant circuit when the first switch is closed. A second switch is connected to the resonant circuit, the second switch connecting the resonant circuit to ground through a low impedance when the first switch is closed. A third switch is connected to a transmit power amplifier connecting the transmit power amplifier to ground through a low impedance when the first switch is closed.

20 Claims, 4 Drawing Sheets

RADIO FRONT END WITH RESONANT TRANSMIT/RECEIVE SWITCH

FIELD OF THE INVENTION

The present invention pertains to the field of radios, and more specifically to a radio with a resonant transmit/receive switch implemented using a switched inductor-capacitor resonator and semiconductor transistors with low breakdown voltage.

BACKGROUND OF THE INVENTION

Resonant switches for use as transmit-receive switches in radio front ends, such as those found in devices for wirelessly transmitting and receiving data, are known in the art. One drawback of prior art resonant switching devices is that two resonators are used in a radio front end, one on a transmission path and the other on a receive path. Another drawback is that the circuits form a parallel resonator or series resonator depending on the state of the switch. The use of two resonators can occupy more semiconductor surface area or more discrete components.

The resonant switch is required to handle high voltage coming from the power amplifier. In some applications, such as cellular phone radios, this voltage can be greater than 10V. Prior art switches to handle such high voltages are implemented by semiconductor devices with high breakdown voltages. Other components in the radio, such as transceivers, are typically implemented using different semiconductor processes having low breakdown voltage devices. Additionally, recent advances have allowed power amplifiers to be also implemented using low breakdown voltage devices. Consequently, it is difficult and costly to integrate the switches with transceivers or with power amplifiers using low breakdown-voltage devices on the same die.

SUMMARY OF THE INVENTION

Therefore it is desirable to have a resonant switch for use in a radio front end which can be more readily integrated with other radio components using low breakdown-voltage devices, such as transceivers and power amplifiers. Furthermore it is desirable that the resonant switch use as few resonators as possible, allowing it to be more readily integrated.

In accordance with the present invention, a resonant switch is provided that overcomes known problems with existing resonant switches.

In particular, a resonant switch is provided with improved resistance to breakdown caused by high voltage imposed on the switch. One important technical advantage of the present invention is that the resonant switch can use components with low breakdown voltages which can be easily integrated with transceivers. The resonant switch can be implemented using standard 0.13 um CMOS processes or other suitable processes.

In accordance with an exemplary embodiment of the present invention, a transceiver having a radio front end is provided. The radio front end includes an inductor having a first end and a second end. A capacitor having a first end and a second end is connected to the second end of the inductor. An antenna is connected to the second end of the inductor and the second end of the capacitor. A first switch is connected to the first end of the inductor and the first end of the capacitor, wherein the inductor and capacitor form a resonant circuit when the first switch is closed. A second switch is connected to the resonant circuit, the second switch connecting the resonant circuit to ground through a low impedance when the first switch is closed. A third switch is connected to a transmit power amplifier connecting the transmit power amplifier to ground through a low impedance when the first switch is closed.

Those skilled in the art will further appreciate the advantages and superior features of the invention together with other important aspects thereof on reading the detailed description that follows in conjunction with the drawings.

DETAILED DESCRIPTION OF PREFERRED EMBODIMENTS

Figure 1:
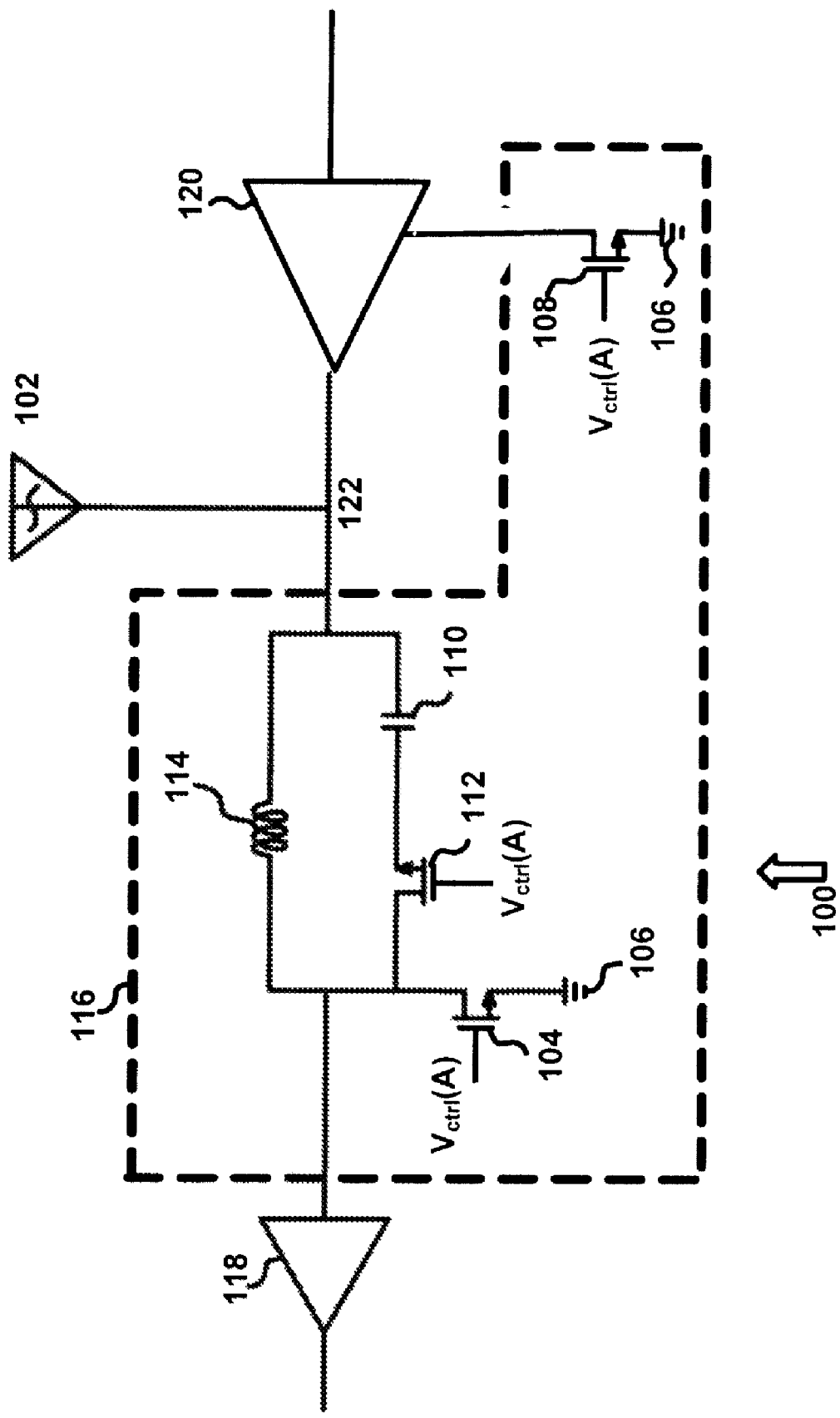
FIG. 1 is a diagram of a resonant switch architecture in accordance with an exemplary embodiment of the present invention.

In the description that follows, like parts are marked throughout the specification and drawings with the same reference numerals. The drawing figures might not be to scale and certain components can be shown in generalized or schematic form and identified by commercial designations in the interest of clarity and conciseness.

FIG. 1 is a diagram of radio front end 100 in accordance with an exemplary embodiment of the present invention. Radio front end 100 can be implemented in silicon, gallium arsenide, or other suitable materials, and can be implemented using complementary metal-oxide semiconductor (CMOS) processes or other suitable processes. Radio front end 100 utilizes a resonant switch to control the transmission or reception of a signal from an antenna.

Radio front end 100 includes resonant switch 116, which is disposed between a transmitter power amplifier 120 and a receiver low noise amplifier 118, and which controls transmission of the signal from antenna 102 to low noise amplifier 118. In one exemplary embodiment, power amplifier 120 can include one or more circular geometry power amplifiers, such as those described in U.S. Pat. No. 7,095,283, entitled "Supply circuit for power amplifier drivers," or U.S. Pat. No. 6,737,948, entitled "Distributed circular geometry power amplifier architecture," each of which is hereby incorporated by reference for all purposes.

In this exemplary embodiment, resonant switch 116 includes inductor 114, capacitor 110, and three switching devices 104, 108, and 112. The switching devices 104, 108 and 112 can be CMOS transistors or other suitable switching devices. Inductor 114 and capacitor 110 form an LC resonator when switching device 112 is on, and have values selected so as to resonate at the fundamental frequency of a transmit signal.

In operation, switching devices 104, 108 and 112 of resonant switch 116 are turned on to allow the LC resonator to resonate at the fundamental frequency of a transmit signal when the transmit signal is to be transmitted using power amplifier 120 and antenna 102. The impedance of the LC resonator thus prevents the transmit signal from being imposed on low noise amplifier 118.

When a signal is to be received, switching devices 104, 108 and 112 of resonant switch 116 are turned off, so that a receive signal received at antenna 102 can reach low noise amplifier 118 and not be blocked by a resonance between inductor 114 and capacitor 110. By not resonating at the fundamental frequency of the receive signal, the impedance of resonant switch 116 between the antenna 102 and low noise amplifier 118 is substantially small, providing a lower impedance path and causing the receive signal to propagate through inductor 114 to low noise amplifier 118.

When radio front end 100 is in transmit mode, switching devices 104, 108 and 112 are turned on, such as by setting $V_{ctrl}$ (A) to a high value. Inductor 114 and capacitor 110 are configured to form an LC resonator which has a resonant frequency at or near the fundamental frequency of the transmit signal when switching device 112 is on. The impedance of the LC resonator seen by power amplifier 120 from the right side of resonant switch 116 is substantially higher than the impedance of antenna 102, which typically can have an impedance of around 50 ohms. Consequently, most of the radio frequency (RF) power generated by power amplifier 120 propagates to antenna 102, and the RF power loss generated by resonant switch 116 is substantially low.

In transmit mode, switching device 104 is on and provides a connection to ground 106 for the LC resonator. This connection maintains the voltage at the input of low noise amplifier 118 at a level that is sufficiently low, such as to avoid damage. Switching device 108 is also on and coupled to ground 106, and also consumes minimal power through its on resistance. As used herein, the term "couple" and its cognate terms such as "couples" and "coupled" can include a physical connection, such as through an electrical conductor, a connection through a switch or intervening device, or other suitable connections.

Switching device 108 connects a node in the power amplifier to ground during transmit while leaving it open during receive, which prevents the output impedance of the power amplifier from having a detrimental effect on the loss of the receive signal from antenna 102 to low noise amplifier 118. In some cases, by selectively removing a ground connection in the power amplifier output network, this loss can be reduced. In one embodiment, power amplifier 120 is a distributed active transformer and switching device 108 is connected in series with the grounded terminal of the transformer secondary winding, which can reduce the loss in receive mode by removing the connection between the secondary and ground when switching device 108 is off during receive mode.

When the output power from power amplifier 120 is high, a high voltage can be imposed on node 122, where the LC resonator, antenna 102, and power amplifier 120 are joined. This voltage can be high enough to cause voltage breakdown of a semiconductor device connected directly to this node if the breakdown voltage of the device is low. For radio front end 100, however, the voltages applied to all three switching devices are low. The on-resistance of switching device 104 is much smaller than the impedance of the LC resonator, so the high voltage is applied across the LC resonator, causing the voltage drop across switching device 104 to be low. Because the on-resistance of switching device 112 is also relatively small compared to the impedance of capacitor 110, the voltage drop across switching device 112 is also low. Switching device 108 presents a small on-resistance compared to the internal components of the power amplifier 120 that are coupled to it. As a result, a low voltage drop occurs across switching device 108, and all three switching devices are not exposed to a high voltage that could result in voltage breakdown.

In a receive mode, all three switching devices 104, 108 and 112 are turned off, such as by setting $V_{ctrl}$ (A) to a low value. With switching device 112 off, the apparent impedance of switching device 112 is much greater and the LC resonator formed by inductor 114 and capacitor 110 does not resonate at the fundamental frequency of the receive signal, which can be close to that of the transmit signal. As a result, the impedance of the LC resonator is essentially that of inductor 114, which allows the received signal from antenna 102 to be transmitted to low noise amplifier 118. Switching device 104 is turned off to reduce the insertion loss of the receive path. Switching device 108 is turned off to reduce the loading effect caused by power amplifier 120.

Figure 2:
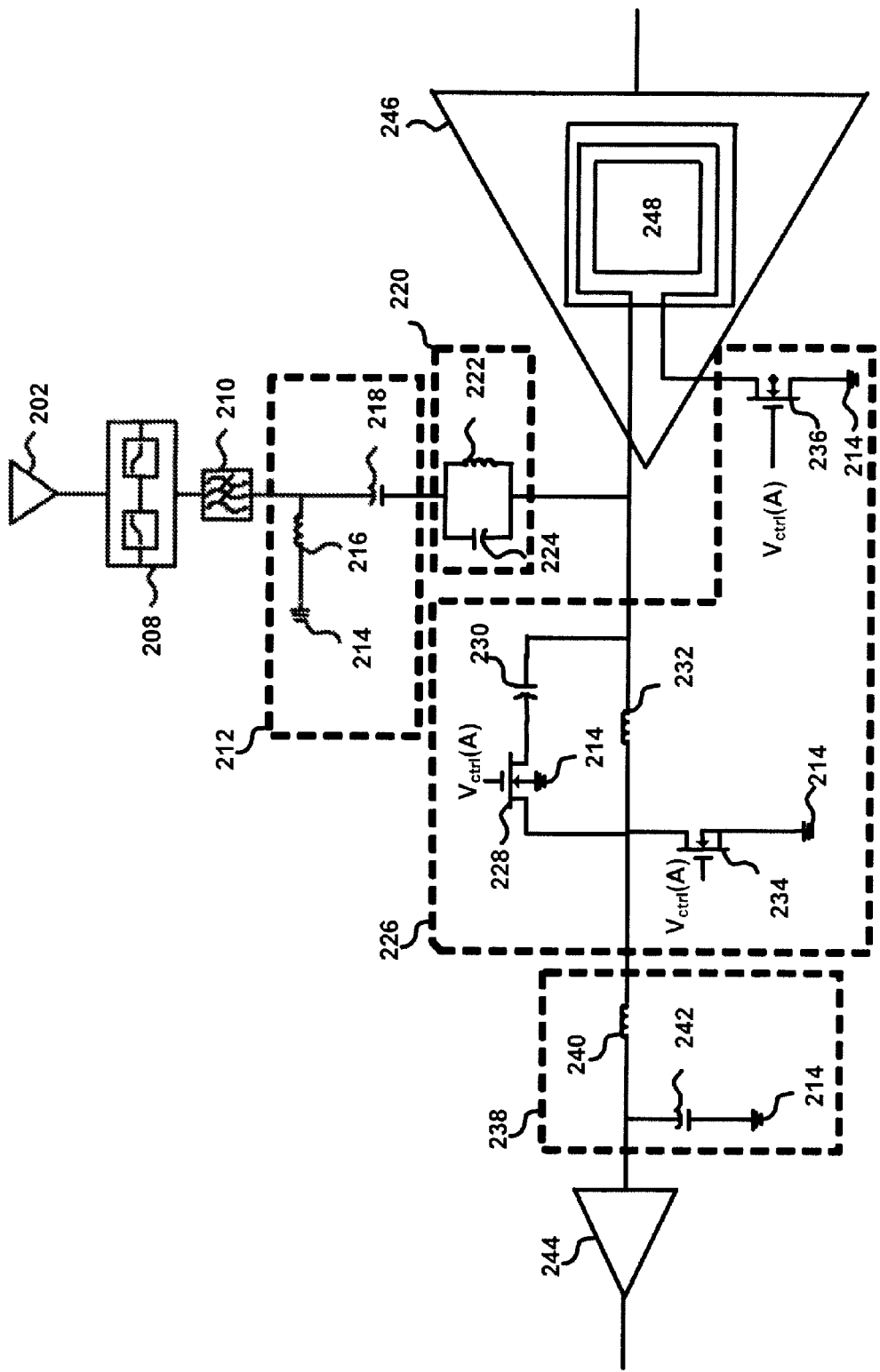
FIG. 2 is a diagram of a resonant switch architecture in accordance with a second exemplary embodiment of the present invention.

FIG. 2 is a diagram of radio front end 200 with a resonant switch in accordance with an exemplary embodiment of the present invention. Radio front end 200 allows a single resonator to be used to control when a signal is transmitted or received.

Radio front end 200 includes antenna 202, optional frequency diplexer network 208, optional low pass filter 210, optional antenna matching network 212, optional harmonic trap 220, power amplifier 246, resonant switch 226, optional receive matching network 238, and low noise amplifier 244. In one exemplary embodiment, power amplifier 246 can include one or more circular geometry power amplifiers 248.

Frequency diplexer network 208 can be used to connect antenna 202 to radio front end 200 at a first transmit and receive frequency or frequencies while connecting antenna 202 to one or more additional circuits at other transmit or receive frequencies. Low pass filter 210 can be used to reduce transmission of output harmonics from power amplifier to the antenna 202, to reduce reception of unwanted frequencies at harmonics of the receive frequency from reaching low noise amplifier 244, or for other suitable purposes. Optional antenna matching network 212 includes inductor 216 and capacitor 218, which can be configured to improve impedance matching between antenna 202 and power amplifier 246 when transmitting a signal, such as if harmonic trap 220 causes a mismatch, or if low pass filter 210 presents a mismatched impedance. Optional harmonic trap 220 includes capacitor 224 in parallel with inductor 222, which have values selected to resonate at a harmonic frequency of the transmission signal, such as the second harmonic. Resonant switch 226 includes capacitor 230, inductor 232, and switching devices 228, 234, and 236. Switching devices 234 and 236 are coupled to ground 214. Switching device 228 is configured to activate a resonance between capacitor 230 and inductor 232 when it is closed. Optional receive matching network 238 includes inductor 240 and capacitor 242, which can be configured to improve the match between antenna 202 and low noise amplifier 244 when receiving a signal.

In transmit mode, switching devices 228, 234, and 236 are on, such as by setting $V_{ctrl}$ (A) to a high value. The transmit signal is amplified by power amplifier 246 and is transmitted through harmonic trap 220 because of the relatively high impedance of resonant switch 226. Harmonic trap 220 can be a notch filter or other suitable circuits that remove unwanted signals, such as signals around a harmonic of the transmit frequency. The transmit signal is then conducted through antenna matching network 212, low pass filter 210, frequency diplexer network 208, to antenna 202 for transmission.

In receive mode, switching devices 228, 234, and 236 are off, such as by setting $V_{ctrl}$ (A) to a low value. The receive signal is collected by antenna 202, and is conducted through inductor 232, which has a relatively small impedance, and receive matching network 238, to low noise amplifier 244.

Figure 3:
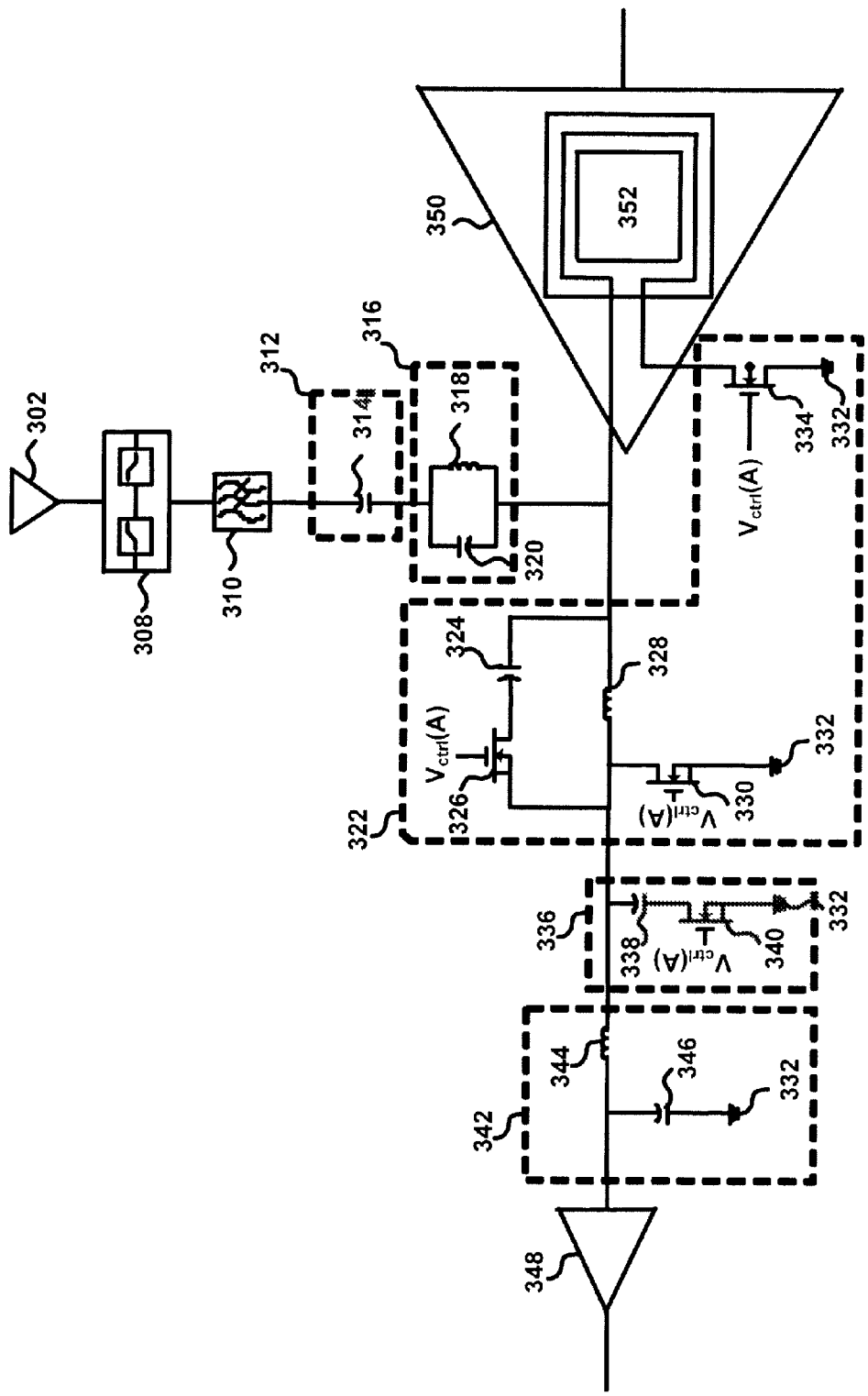
FIG. 3 is a diagram of a resonant switch architecture in accordance with a third exemplary embodiment of the present invention.

FIG. 3 is a diagram of radio front end 300 having a resonant switch architecture with improved cross band isolation in accordance with an exemplary embodiment of the present invention. Radio front end 300 allows a single resonator to control when a circuit transmits or receives a signal.

Radio front end 300 includes antenna 302, matched diplexer 308, harmonic filter 310, antenna matching network 312, harmonic trap 316, power amplifier 350, resonant switch 322, cross band isolation circuit 336, receive matching network 342, and low noise amplifier 348. In one exemplary embodiment, power amplifier 350 can include one or more circular geometry power amplifiers 352.

Optional diplexer 308 can be used to connect antenna 302 to radio front end 300 at a first transmit and receive frequency or frequencies while connecting antenna 302 to one or more additional radios at other transmit or receive frequencies. Optional antenna matching network 312 includes capacitor 314. Harmonic trap 316 includes capacitor 320 in parallel with inductor 318. Resonant switch 322 includes capacitor 324, inductor 328, and switching devices 326, 330, and 334. Switching devices 330, and 334 are coupled to ground 332. Switching device 326 is configured to activate a resonance between inductor 328 and capacitor 324 when the switch is closed. Cross band isolation circuit 336 includes capacitor 338 and switch 340 coupled to ground 332 and to inductor 328. Receive matching network 342 includes inductor 344 and capacitor 346.

In transmit mode, switching devices 326, 330, and 334 are on, such as by setting $V_{ctrl}$ (A) to a high value. The transmit signal is amplified by power amplifier 350, and propagates through harmonic trap 316 to antenna 302 because resonant switch 322 has a substantially high impedance. Harmonic trap 316 can be a notch filter or other suitable circuit for removing unwanted signals, such as second harmonic signals. The transmit signal then propagates through antenna matching network 312, harmonic filter 310, diplexer 308, to antenna 302 for transmission.

In receive mode, switching devices 326, 330, and 334 are off, such as by setting $V_{ctrl}$ (A) to a low value. The receive signal is collected by antenna 302, and propagates through inductor 328, and receive matching network 342, to low noise amplifier 348.

When radio front end 300 is neither transmitting or receiving, cross band isolation circuit 336 can be activated to improve the isolation between radio front end 300 and other circuitry that may be transmitting at a transmit frequency. Capacitor 338 is configured to resonate with inductor 328 when switch 340 is activated to provide a low impedance to ground 332 at a transmit frequency of the other circuitry when switch 340 is activated. This can be used to reduce leakage of the other circuit's transmit frequency or its harmonics through power amplifier 350 to antenna 302. In one embodiment, the other circuit's frequency can be approximately a subharmonic, such as approximately one half the frequency, of the transmit frequency of radio front end 300. In this embodiment, capacitor 338 and inductor 328 can resonate near a harmonic, such as the second harmonic, of the other circuit's transmit frequency when switch 340 is activated.

Figure 4:
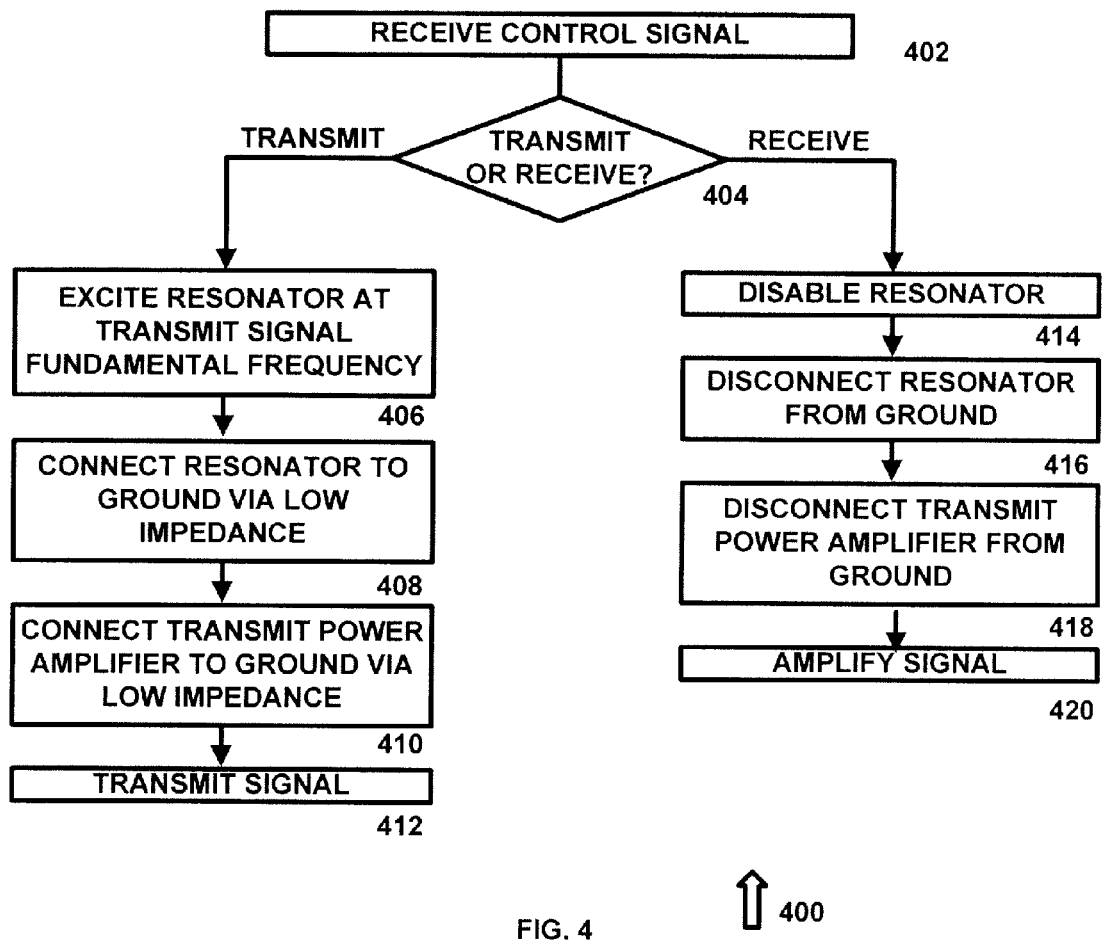
FIG. 4 is a diagram of a method for operating a resonant switch in accordance with an exemplary embodiment of the present invention.

FIG. 4 is a diagram of method 400 for operating a radio front end using a single resonant switch in accordance with an exemplary embodiment of the present invention. Method 400 begins at 402 where a control signal is received. In one exemplary embodiment, the control signal can be derived from a transmit/receive controller, can be based on a synchronized transmit/receive time division multiple access (TDMA) controller, or can be derived in other suitable manners. The method then proceeds to 404.

At 404, it is determined whether the control signal is for transmission or reception. If it is determined that the control signal is for transmission, the method proceeds to 406. Otherwise, if it is determined that the control signal is for reception, the method proceeds to 414.

At 406, a resonant switch is activated, such as by turning on one or more switches so as to cause a resonant circuit to be formed. The method then proceeds to 408.

At 408, the resonator is connected to ground through a low impedance connection, such as by a second switch or in other suitable manners, so as to reduce the voltage seen by the one or more switches that are used to activate the resonator or for other suitable purposes. The method then proceeds to 410.

At 410, the power amplifier is connected to ground through a low impedance connection, such as by a third switch or in other suitable manners, so as to enable the power amplifier to transmit into the antenna, to reduce the voltage seen by the one or more switches that are used to activate the resonator, to reduce the voltage seen by a receiver, or for other suitable purposes. The method then proceeds to 412, where the transmit signal is transmitted, such as by conducting the transmit signal to an antenna and blocking transmission of the transmit signal to a receiver using the resonant circuit or in other suitable manners.

At 414, the resonator is disabled, such as by turning one or more switches off so as to allow the signal received at the antenna to be transmitted through a low impedance, such as an inductor. The method then proceeds to 416.

At 416, the resonator is disconnected from ground, such as by opening a second switch or in other suitable manners so as to reduce the insertion loss of the resonant switch or for other suitable purposes. The method then proceeds to 418.

At 418, the output network of a transmit power amplifier is disconnected from ground, such as by opening a third switch or in other suitable manners so as to reduce the insertion loss of the resonant switch or for other suitable purposes. The method then proceeds to 420.

At 420, the received signal is amplified, such as by using a low noise amplifier or other suitable devices. Because the resonant switch and transmit power amplifier have also been isolated from ground, the insertion loss due to the presence of the resonant switch is reduced so as to minimize the interference of the resonant switch with the received signal.

In operation, method 400 allows a resonant switch or other suitable devices to be used to control the transmission and reception of a signal while reducing the breakdown voltage imposed on switching devices and reducing the insertion loss resulting from the presence of the resonant switch or other suitable device. Thus, method 400 provides for improved control of a radio front end with decreased risk of voltage breakdown and minimization of the insertion loss generated by the transmit/receive switch.

Although exemplary embodiments of a system and method of the present invention have been described in detail herein, those skilled in the art will also recognize that various substitutions and modifications can be made to the systems and methods without departing from the scope and spirit of the appended claims.

What is claimed is:

1. A device including a radio front end comprising:
an inductor having a first end and a second end;
a capacitor having a first end and a second end coupled to the second end of the inductor;

an antenna coupled to the second end of the inductor and the second end of the capacitor;

and a first switch coupled to the first end of the inductor and the first end of the capacitor, wherein the inductor and capacitor form a resonant circuit when the first switch is closed;

a second switch coupled to the resonant circuit, the second switch connecting the resonant circuit to ground through a low impedance when the first switch is closed; and a third switch directly coupled to a transmit power amplifier connecting the transmit power amplifier to ground through a low impedance when the first switch is closed.

2. The device of claim 1 wherein the resonant circuit resonates at a transmit frequency.

3. The device of claim 1 wherein the second switch is directly connected to the first end of the inductor and is distinct and separate from the third switch.

4. The device of claim 1 wherein the second switch is connected to the first switch.

5. The device of claim 1 wherein the transmit power amplifier is coupled to the second end of the inductor and the second end of the capacitor.

6. The device of claim 1 wherein the power amplifier comprises a circular geometry power amplifier.

7. The device of claim 1 further comprising:

a second capacitor having a first end and a second end coupled to the first end of the capacitor;

a fourth switch coupled to the first end of the second capacitor and ground.

8. The device of claim 7 wherein the fourth switch is turned on to provide a low impedance to ground at a harmonic of a frequency other than a transmit frequency of the device.

9. A method for operating a radio front end comprising:

closing a first switch to isolate a receiver amplifier;

closing a second switch so as to form a low impedance path to ground the first switch, to reduce a voltage at a terminal of the first switch;

closing a third switch so as to form a low impedance path to ground for a transmitter power amplifier;

and wherein the third switch is directly connected to the power amplifier.

10. The method of claim 9 wherein closing the first switch to isolate the receiver amplifier comprises closing the first switch so as to form a resonant circuit that resonates at the transmission frequency.

11. The method of claim 9 further comprising opening the first switch so as to create a low impedance connection between an antenna and the receiver amplifier.

12. The method of claim 9 further comprising opening the second switch so as to decrease the insertion loss of a transmit/receive switch.

13. The method of claim 9 further comprising opening the third switch so as to decrease the insertion loss of a transmit/receive switch.

14. A device including a radio front end comprising:

a switching circuit for switching between a transmit mode of operation and a receive mode of operation, the switching circuit including a switch directly connected to a transmit power amplifier and configured to form a low impedance path to ground during the receive mode of operation;

means for reducing a voltage imposed on the resonant switch means; and means for reducing an insertion loss of the resonant switch means.

15. The device of claim 14 wherein the resonant switch means comprises:

an inductor;

a capacitor coupled to the inductor; and a switch coupled to the inductor and the capacitor.

16. The device of claim 15 wherein the means for reducing the voltage imposed on the resonant switch means comprises a low resistance connection between the resonant switch means and ground.

17. The device of claim 15 wherein the means for reducing the voltage imposed on the resonant switch means comprises a low resistance connection between a transmitter amplifier and ground.

18. The device of claim 15 wherein the means for reducing the insertion loss of the resonant switch means comprises a switch for removing a low resistance connection between the resonant switch means and ground.

19. The device of claim 15 wherein the means for reducing the insertion loss of the resonant switch means comprises a switch for removing a low resistance connection between a transmitter amplifier and ground.

20. The device of claim 14 further comprising cross band isolation means for isolating the device from other circuitry when the device is neither transmitting or receiving.

* * * * *